(12) United States Patent
Litwiller

(10) Patent No.: US 10,112,815 B2
(45) Date of Patent: Oct. 30, 2018

(54) HIGH REACH LIFTING BIG BALE FORK ATTACHMENT

(71) Applicant: Sheldon Litwiller, Buhl, ID (US)

(72) Inventor: Sheldon Litwiller, Buhl, ID (US)

( * ) Notice: Subject to any disclaimer, the term of this patent is extended or adjusted under 35 U.S.C. 154(b) by 229 days.

(21) Appl. No.: 15/009,805

(22) Filed: Jan. 28, 2016

(65) Prior Publication Data

US 2016/0214841 A1 Jul. 28, 2016

Related U.S. Application Data

(60) Provisional application No. 62/108,572, filed on Jan. 28, 2015.

(51) Int. Cl.
| | |
|---|---|
| *B66F 9/08* | (2006.01) |
| *A01D 87/12* | (2006.01) |
| *B66F 9/065* | (2006.01) |
| *B66F 9/12* | (2006.01) |
| *A01D 85/00* | (2006.01) |

(52) U.S. Cl.
CPC .............. *B66F 9/08* (2013.01); *A01D 85/005* (2013.01); *A01D 87/122* (2013.01); *B66F 9/065* (2013.01); *B66F 9/12* (2013.01)

(58) Field of Classification Search
CPC ............ A01D 87/0069; A01D 87/0076; A01D 87/0084; A01D 85/005; A01D 87/122; B66F 9/08; B66F 9/082; B66F 9/085; B66F 9/087; B66F 9/10; B66F 9/065; B66F 9/12; E02F 3/304; E02F 3/305; E02F 3/3405; E02F 3/3408; E02F 3/3411; E02F 3/3417; E02F 3/352; E02F 3/3604; E02F 3/3609; E02F 3/3622; E02F 3/3627; E02F 3/3631; E02F 3/3677
USPC .......... 37/416, 428; 414/565, 566, 688, 705, 414/709, 715, 723, 728, 732
See application file for complete search history.

(56) References Cited

U.S. PATENT DOCUMENTS

| | | | | |
|---|---|---|---|---|
| 2,621,817 A | * | 12/1952 | McNamara, Jr. | .. A01D 87/0069 414/707 |
| 2,883,080 A | * | 4/1959 | Brandt | ............... A01D 87/0069 414/635 |
| 3,024,933 A | * | 3/1962 | Albert | ..................... B66F 9/065 414/705 |

(Continued)

*Primary Examiner* — Saul Rodriguez
*Assistant Examiner* — Brendan P Tighe
(74) *Attorney, Agent, or Firm* — Charles R. Clark

(57) ABSTRACT

The present invention is a high reach lifting big bale fork attachment for attachment to a wheel loader, a large front end loader for an agricultural tractor, a large construction loader, a large forklift or other big bale handling equipment. The high reach lifting big bale fork attachment has a rear coupler slide assembly slidingly connected to a sliding mast assembly having two spaced mast I-beams each beam having a straight rear rail and an arced front rail. When attached to a wheel loader or bale handling equipment, the invention provides improved elevation and offset capabilities to the wheel loader or other bale handling equipment in lifting, moving, tilting, and depositing or retrieving one or more vertically stacked bales onto or from a place of deposit such as the ground, hay barn or shed, or a preexisting bale stack in an agricultural setting. When equipped with the invention, the bale handling equipment can place or retrieve bales higher and further forward and over higher obstacles.

11 Claims, 8 Drawing Sheets

(56) References Cited

U.S. PATENT DOCUMENTS

| | | | | | |
|---|---|---|---|---|---|
| 3,182,833 | A | * | 5/1965 | Lull | B66F 9/18 414/697 |
| 3,543,957 | A | * | 12/1970 | Russell | B66F 9/10 414/707 |
| 3,647,099 | A | * | 3/1972 | Carriere | B66F 9/065 414/607 |
| 3,845,871 | A | * | 11/1974 | DiLillo | E02F 3/3636 414/723 |
| 4,553,899 | A | * | 11/1985 | Magni | B66F 9/0655 414/629 |
| 4,571,146 | A | * | 2/1986 | Eriksson | E02F 3/3695 37/403 |
| 4,930,974 | A | * | 6/1990 | Langenfeld | A01D 87/0069 414/631 |
| 5,127,791 | A | * | 7/1992 | Attman | B66F 9/0655 414/10 |
| 5,560,129 | A | * | 10/1996 | Rothbart | B66F 9/12 37/231 |
| 5,829,940 | A | * | 11/1998 | Mahaney | A01D 87/126 414/111 |
| 8,047,759 | B2 | * | 11/2011 | Ladd | B66F 9/0655 414/685 |

* cited by examiner

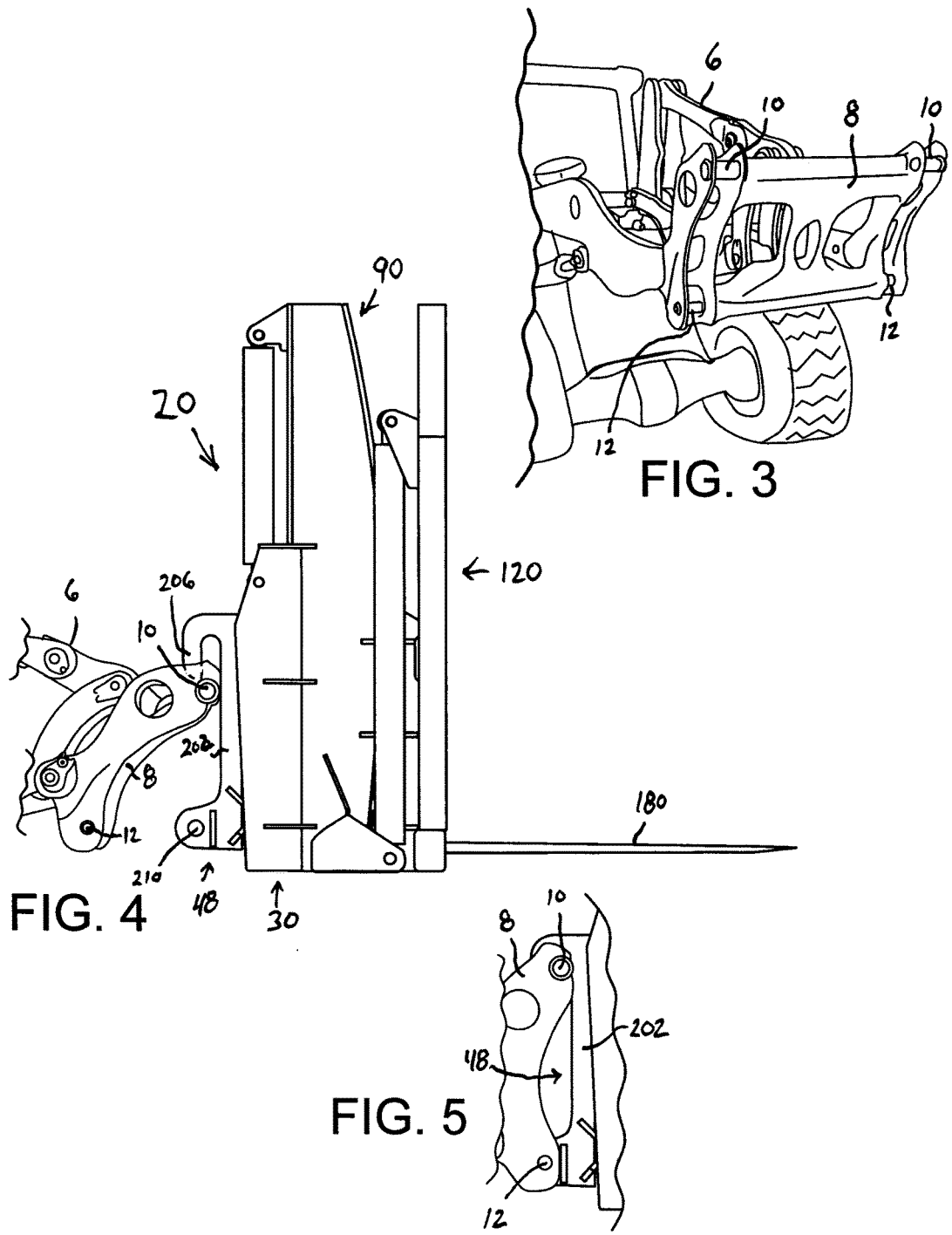

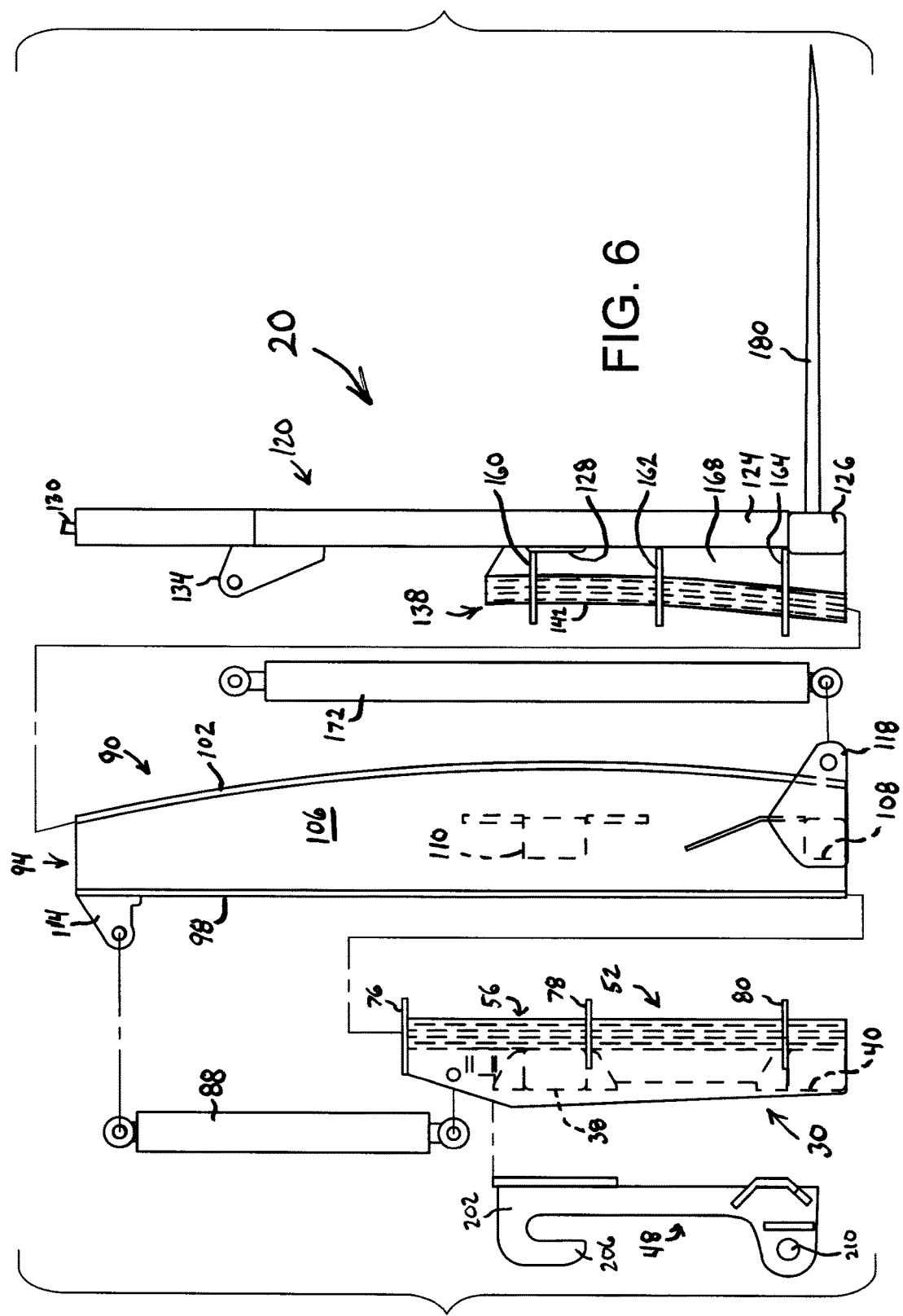

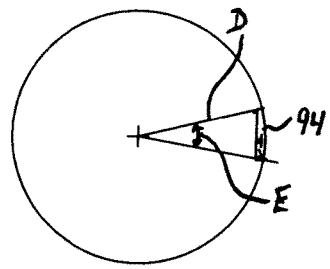
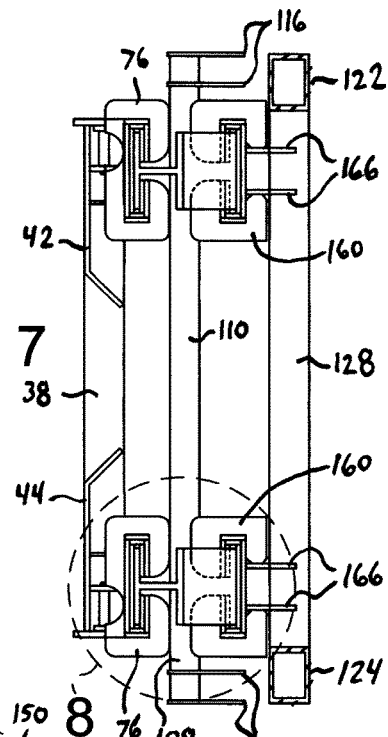
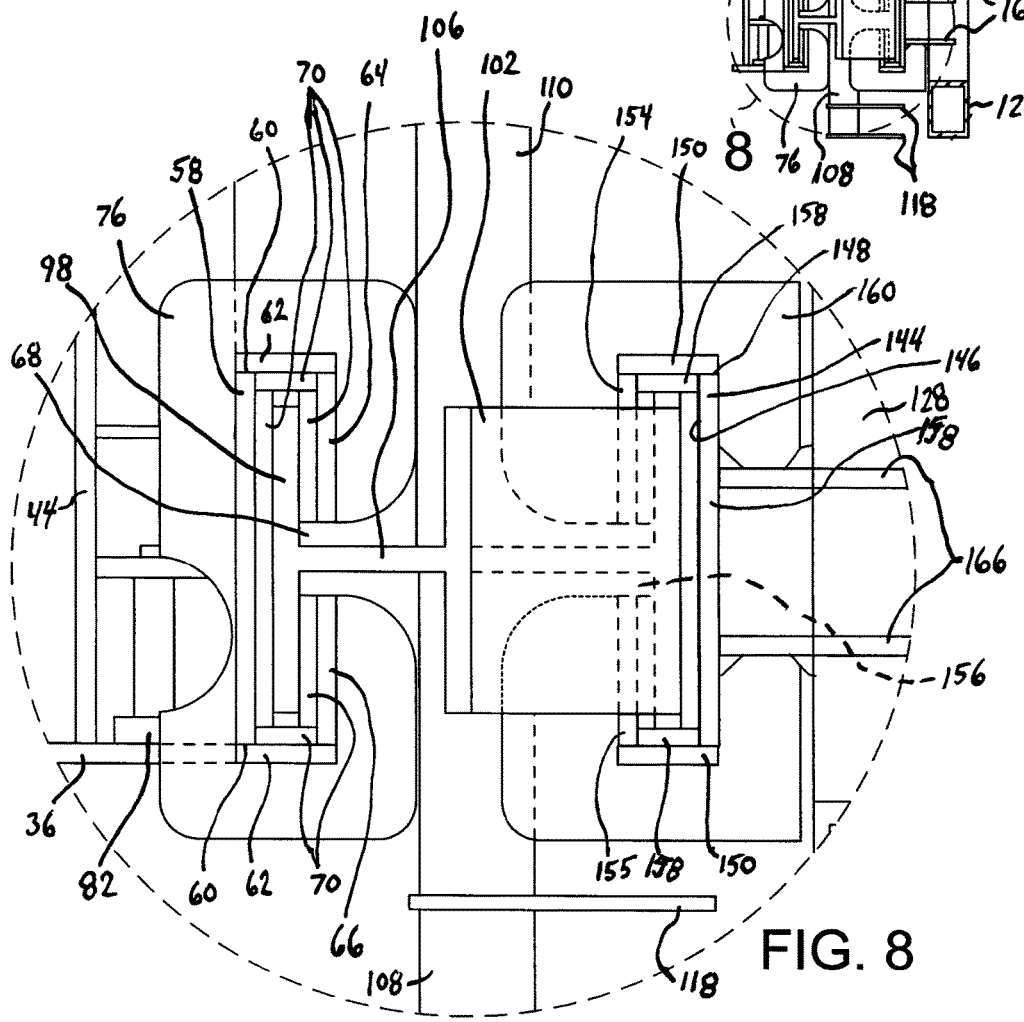

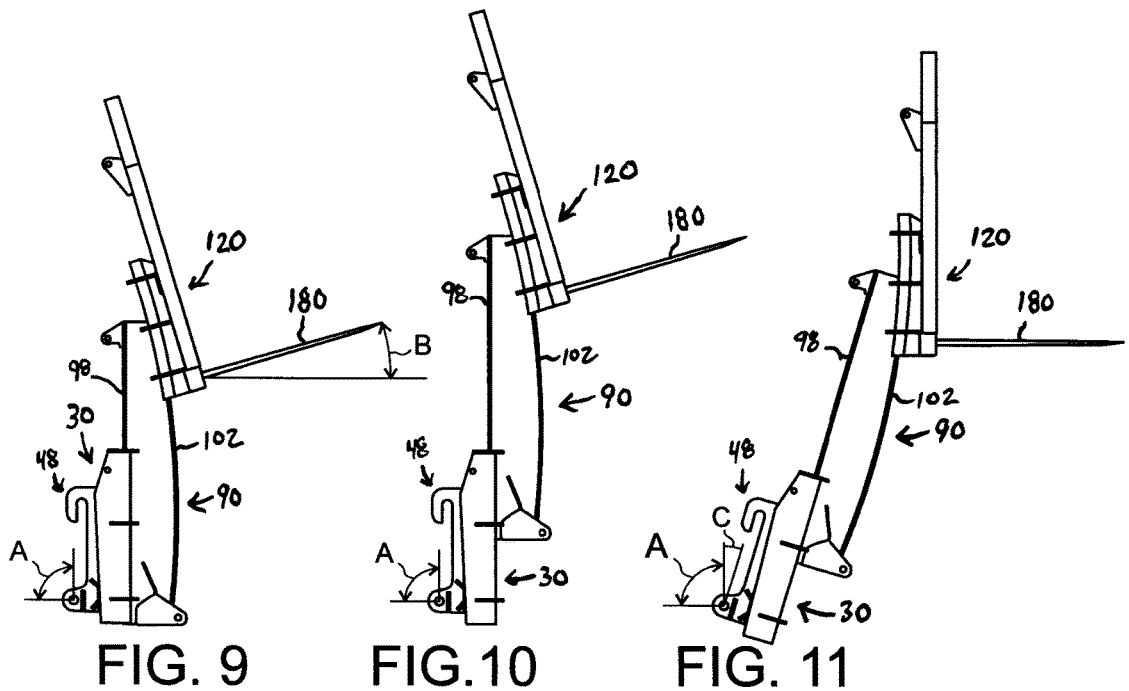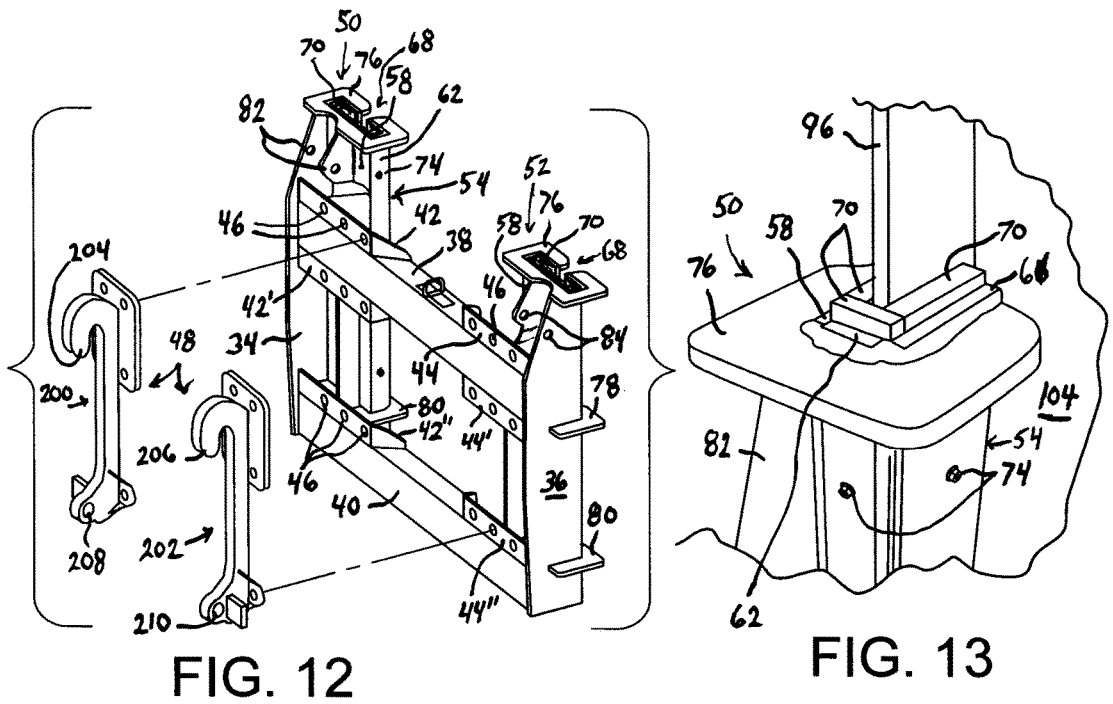

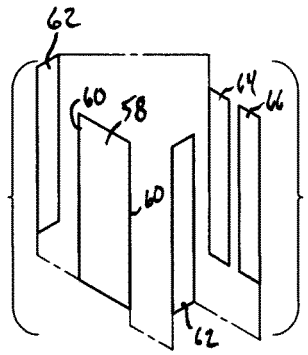 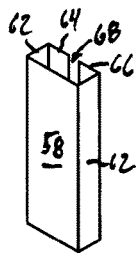 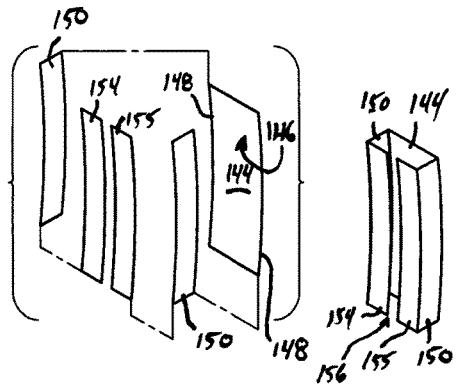 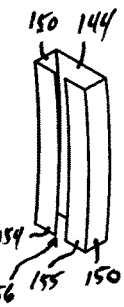
FIG. 15    FIG. 16    FIG. 17    FIG. 18
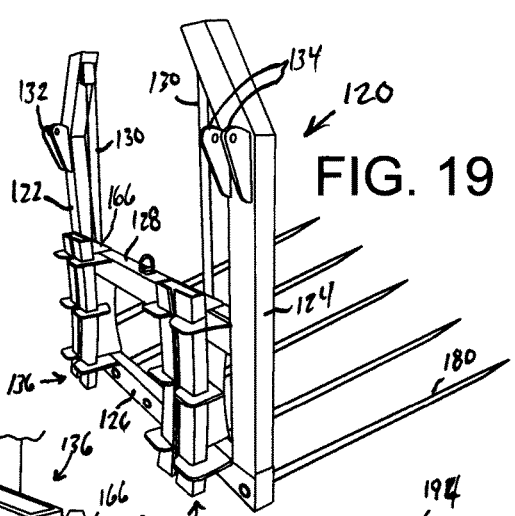 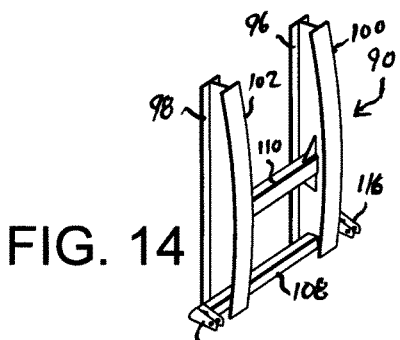 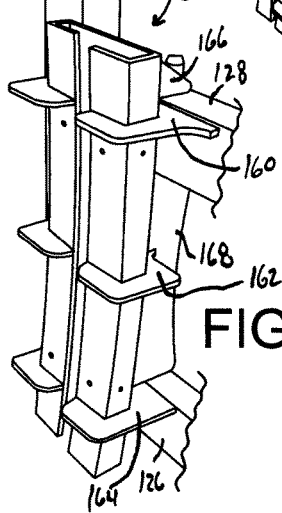 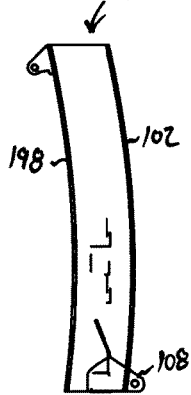 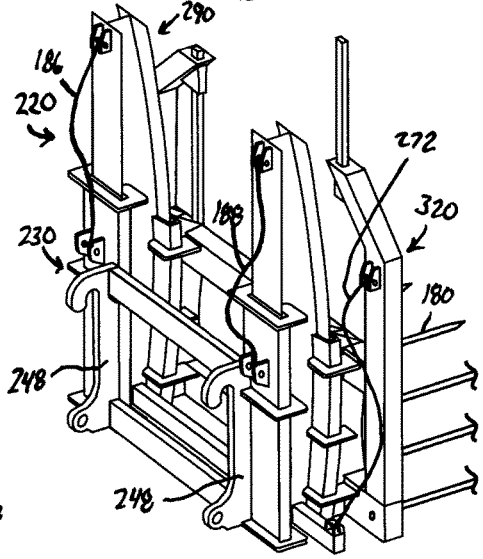
FIG. 19    FIG. 14    FIG. 20    FIG. 21    FIG. 22

HIGH REACH LIFTING BIG BALE FORK ATTACHMENT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Field of the Invention

The present invention relates to replacing or supplanting a preexisting non-extendable bale fork attachment of a wheel loader, a large front end loader for an agricultural tractor, a large construction loader, a large forklift or other big bale handling equipment with a novel, more capable and improved high reach lifting big bale fork attachment that selectively can lift, move, tilt, and deposit or retrieve one or more vertically stacked bales onto or from a place of deposit such as the ground, hay barn or shed, or a preexisting bale stack in an agricultural setting. A wheel loader or another similar loader or other big bale handling equipment after having the invention attached has more utility than before—once equipped with the invention the bale handling equipment can place or retrieve bales higher and further forward and over higher obstacles such as lower bale layers than the bale handling equipment could before being equipped with the invention.

The invention enables the lifting, tilting, and depositing or retrieving of one or more vertically stacked mid-size or big bales from an initial place of deposit onto a different place of deposit at ground level or atop or offset forward over a preexisting stack of bales or layer of bales to create a more stable stack of bales, see FIGS. 23 to 27, during consolidation with or subtraction from other stacks or layers of bales.

The invention can serve as a useful bale handling attachment for an existing piece of bale handling equipment. The invention can be quickly mounted to bale handling equipment such as a Deere™, Cat™, Volvo™, LeBaer™, Komatsu™, or Case™ wheel loader having a ACS™, Balderson™, Cat™ Fusion™, Cat™ IT™, John Deere™ Hi Vis™, JRB™ 416, JRB™ 580, L.C.™, or Volvo™ attachment coupler by use of an appropriate adapter that can attach to a plurality of loader attachment adapter mounting brackets attached to selected rear portions of a coupler and slide assembly of the invention by nuts and bolts. Other bale handling equipment not having an attachment coupler may also be equipped with the invention by use of an appropriately selected or configured adapter (mechanical linkage) between said equipment and preferably the adapter mounting brackets.

A piece of bale handling equipment equipped with the invention, a high reach lifting big bale fork attachment, has an improved ability to elevate and extend forward a lifted bale or bales than when the bale handling equipment is equipped with a nonextending bale fork attachment. In the best embodiment, the high reach lifting big bale fork attachment incorporates two spaced upright mast I-beams each beam having a straight rear rail and a convex arced front rail that operatively cooperate with a pair of spaced rear C-channels that slide up and down the straight rear rails of the mast I-beams and with a pair of spaced front C-channels that ride up and down the front arced rails. The rear rails of the mast I-beams are straight and the front rails have a constant arc with a preferred selected radius D of about 180 inches for a best embodiment selected from a range of 160 inches to 250 inches and a preferred selected arc angle E of about 24 degrees for said best embodiment selected from a range of ten to thirty degrees providing in said best embodiment a mast I-beam having a preferred length of approximately 75 inches. See FIGS. 6, 9 to 11, and 23 to 28. The straight rear rail of each mast I-beam slidingly cooperates with a straight C-channel of a respective straight rear mast coupler assembly and the arced front rail of each mast I-beam slidingly cooperates with a respective arced C-channel of a respective arced front mast coupler assembly. Preferably each of said C-channels is lined with low friction UHMW (Ultra High Molecular Weight) plastic sheeting. Preferably, the arced front mast rails are arced over a mast height of approximately 75 inches with a selected radius chosen from a range of 160 to 250 inches. See FIG. 6. The arced front rails provide an improved ability for offset placement of lifted big bales when the attachment is at full extension. See FIGS. 6, 9 to 11, and 23 to 27.

The invention provides an operator with an improved ability to stack and retrieve bales to and from taller bale stacks without having to use another special piece of equipment to achieve the same results. The arc design of the mast arced front rail provides the operator with an improved horizontal reach at full extension for greater offset stacking ability to allow the operator to build a more stable stack. The invention can selectively transition between a fully retracted down position and a fully extended up position. See FIGS. 9 to 11. With the fork attachment, in the fully retracted down position, a loader or other bale handling equipment when equipped with the invention can be used in a lower headroom work environment such as often exists inside many bale storage buildings such as hay sheds. Preferably, the invention is hydraulically powered so its bale rack assembly can be pulled down using hydraulic power unlike some other lifting equipment that use a lifting chain to raise a load and rely on gravity to lower a lifted load.

BRIEF SUMMARY OF THE INVENTION

A principal objective of the invention is to provide a wheel loader or other similar piece of bale handling equipment with a novel and improved high reach lifting big bale fork attachment that is lightweight, compact, simple, low-maintenance, and reliable that permits a farmer or other user to reach higher and farther forward with bales lifted, moved, and deposited or retrieved by use of the attachment than was possible before with previous bale fork attachments.

The invention can be easily attached to a wheel loader 6 or other bale handling equipment having a compatible attachment coupler or other known attachment means by removal of a prior attachment and then coupling of the invention to the attachment coupler and by easy connection of a plurality of hydraulic lines of a plurality of hydraulic actuators of the invention to a pre-existing hydraulic system of the bale handling equipment.

Preferably, the attachment has two quick connect hydraulic lines to connect to a selected hydraulic circuit of a preexisting hydraulic system of the wheel loader or other equipment to power the four actuators of the invention selectively to extend or retract. The four actuators of the invention selectively can be powered by attachment to a selected hydraulic circuit of the wheel loader or other equipment by a person reasonably skilled in the hydraulic power art.

The control of the actuators of the invention may be accomplished by selective manual manipulation of the loader controls that control said hydraulic circuit or by use of a custom software program that is able to control said circuit and control the invention's actuators.

Additional and various other objects and advantages attained by the invention will become more apparent as the specification is read and the accompanying figures are reviewed.

BRIEF DESCRIPTION OF THE SEVERAL VIEWS OF THE DRAWING

FIG. 3 is a partial, perspective view of a wheel loader 6 having a wheel loader attachment coupler 8 having a plurality of fixed upper loader attaching pins 10 and a plurality of selective slidable lower loader attaching pins 12

FIG. 4 is a partial, side view of a wheel loader attachment coupler 8 in a transition position while attaching to a loader attachment adapter means 48 having a hook and eyelet plate 202, 200 having an upper hook 206, 204 and a lower eyelet aperture 210, 208 of said high reach lifting big bale fork attachment 20;

FIG. 5 is a partial, side view of a wheel loader attachment coupler 8 attached to said loader attachment adapter 48 shown in FIG. 4;

FIG. 6 is a partially exploded, side view of the high reach lifting big bale fork attachment 20 shown in FIG. 2 showing a rear coupler slide assembly 30 having two spaced rear mast coupler assemblies 52, 50 to slidingly receive and retain a sliding mast assembly 90 having two spaced mast I-beams 94, 92 each said I-beam having a straight rear rail 98, 96 and a convex arced front rail 102, 100 with respective said rear rails and said front rails joined together by a respective bridging I-web member 106, 104 and showing said sliding mast assembly to be slidingly received and retained by a front bale rack assembly 120 having two spaced concave arced front mast coupler assemblies 138, 136 each said front mast coupler assembly sized to slidingly receive and cooperate with respective said convex arced front rails of said sliding mast assembly;

FIG. 7 is a partial, top plan view of the high reach lifting big bale fork attachment 20 (two lifting mast actuators of the attachment are not shown);

FIG. 8 is an enlarged, partial, top plan view of the high reach lifting big bale fork attachment 20 as indicated in FIG. 7;

FIG. 9 is a side view of the high reach lifting big bale fork attachment 20 shown in FIG. 2 in an intermediate transition position between the retracted down position and an extended up position (actuators and some connecting ears are not shown) with the rear coupler slide assembly 30 and the sliding mast assembly 90 not tilted from their retracted down positions as indicated by angle A and the bale rack assembly 120 elevated and tilted left by the movement of the front bale rack assembly 120 up the convex arced front rails of the sliding mast assembly 90 as indicated by angle B (approximately 16 degrees relative from a horizontal retracted down position in a best embodiment) yielding an upward directed orientation for a bale spear 180;

FIG. 10 is a side view of the high reach lifting big bale fork attachment 20 shown in FIG. 2 in an extended up position (actuators and some connecting ears are not shown) by the movement of the sliding mast assembly 90 up the straight rear rails and elevated and tilted left by the movement of the front bale rack assembly 120 up the convex arced front rails of the sliding mast assembly yielding an upward directed orientation for a bale spear 180;

FIG. 11 is a side view of the high reach lifting big bale fork attachment 20 shown in FIG. 2 in an extended up position (actuators and some connecting ears are not shown) and tilted right by a loader an angle C approximately 24 degrees in a best embodiment yielding a forward movement and horizontal orientation for the bale spear 180;

FIG. 12 is a partially exploded, partial, perspective view from slightly above the right rear quarter of a rear coupler slide assembly 30 showing two straight rear mast coupler assemblies 50, 52 attached to, across, and in front of an upper cross rail 38 and a lower cross rail 40 and showing an exemplar attachment adapter means 48 for attaching the fork attachment to a loader (not shown)(the illustrated loader attachment adapters 48 shown are compatible with various Volvo™ wheel loaders models (L50E and L50G). See FIGS. 4, 5, and 6);

FIG. 13 is a partial, perspective view from slightly above the right front quarter of a high reach lifting big bale fork attachment 20 showing a straight rear mast coupler assembly 50 that slidingly receives and cooperates with a respective straight rear rail 96 and showing portions of a plurality of ultrahigh molecular weight (UHMW) plastic interfacing sheets 70, with said sheets shown lining a rear straight C-channel 54 and anchored along the interior surfaces of said C-channels by a plurality of countersunk bolts from the interior of said C-channel through the walls of the C-channel and retained by a plurality of nuts 74;

FIG. 14 is a partial, perspective view from above the right front quarter and showing the front portions of the sliding mast assembly 90 having two spaced straight rear rails 96, 98 and two spaced convex arced front rails 100, 102 joined by a lower mast cross member 108 and preferably joined by a spaced upper mast cross member 110;

FIG. 15 is an exploded schematic, perspective view from above the right rear quarter of a rear straight C-channel 54, 56 showing the orientation of the respective walls of said straight C-channel;

FIG. 16 is an assembled schematic, perspective view from above the right rear quarter of a rear straight C-channel 54, 56 showing the orientation of the respective joined walls of said straight C-channel and showing a front straight receiving gap 68;

FIG. 17 is an exploded schematic, perspective view from above the right rear quarter of a front convex arced C-channel 140, 142 showing the orientation of the respective walls of said front convex arced C-channel;

FIG. 18 is an assembled schematic, perspective view from above the right rear quarter of a front convex arced C-channel 140, 142 showing the orientation of the respective joined walls of said front convex arced C-channel and showing a rear concave receiving gap 156;

FIG. 19 is a partial, perspective view from slightly above the right rear quarter of a front bale rack assembly 120 having two spaced frame side rails 122, 124 joined one to the other by a lower horizontal frame cross rail 126 and also preferably by a spaced upper frame cross rail 128 and showing two selectively extendable vertical rear side of bale support members 130, two pairs of upper bale rack assembly lifting actuator connecting ears 132, 134, attached to selected respective outer rear upper surfaces of each said frame side rail, two spaced concave arced front mast coupler assemblies 136, 138 each said front mast coupler assembly sized and attached to, across, and in back of said frame cross rails to slidingly receive and cooperate with respective said convex arced front rails of said sliding mast assembly;

FIG. 20 is a partial, perspective view from slightly above the right rear quarter of a front bale rack assembly 120 and showing a concave arced front mast coupler assembly 136 (UHMW plastic sheets are not shown);

FIG. 21 is a side view of an alternative mast I-beam 192, 194 that has a concave arced rear rail 196, 198 and a convex arced front rail 100, 102 that could be used in an alternative fork attachment having alternative convex arced rear mast coupler assemblies to slidingly receive and cooperate with respective said concave arced rear rails 196, 198;

FIG. 22 is a perspective view from above the right rear quarter of an alternative embodiment of a high reach lifting big bale fork attachment 220 and showing an alternative loader attachment adapter means 248, an alternative rear coupler and slide assembly 230, an alternative sliding mast assembly 290, and an alternative front bale rack assembly 320 (actuators not shown but their loci are shown by reference lines 186, 188, and 272);

FIG. 28 is a schematic side view of a reference circle having a radius D and an arc angle of E relative to a mast I-beam 94.

DETAILED DESCRIPTION OF THE INVENTION

Figure 1:
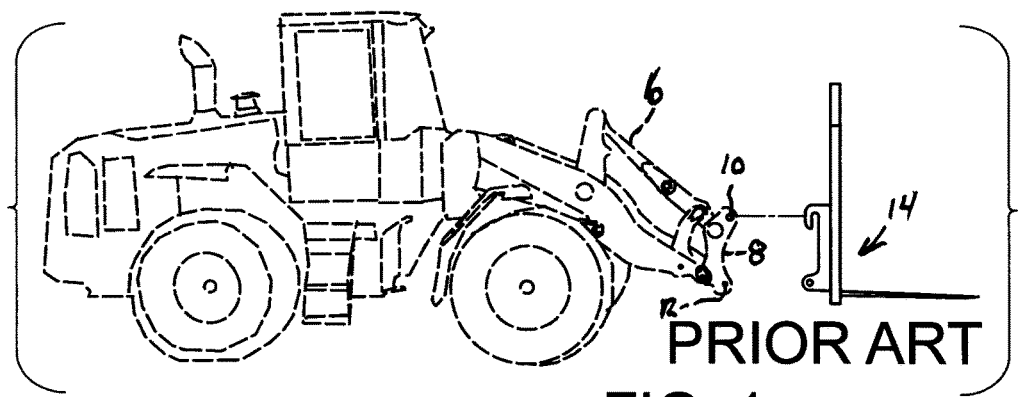
FIG. 1 is a side view of a wheel loader 6 oriented to approach and to engage a prior art nonelevating, nonextending bale fork attachment 14.
Figure 2:
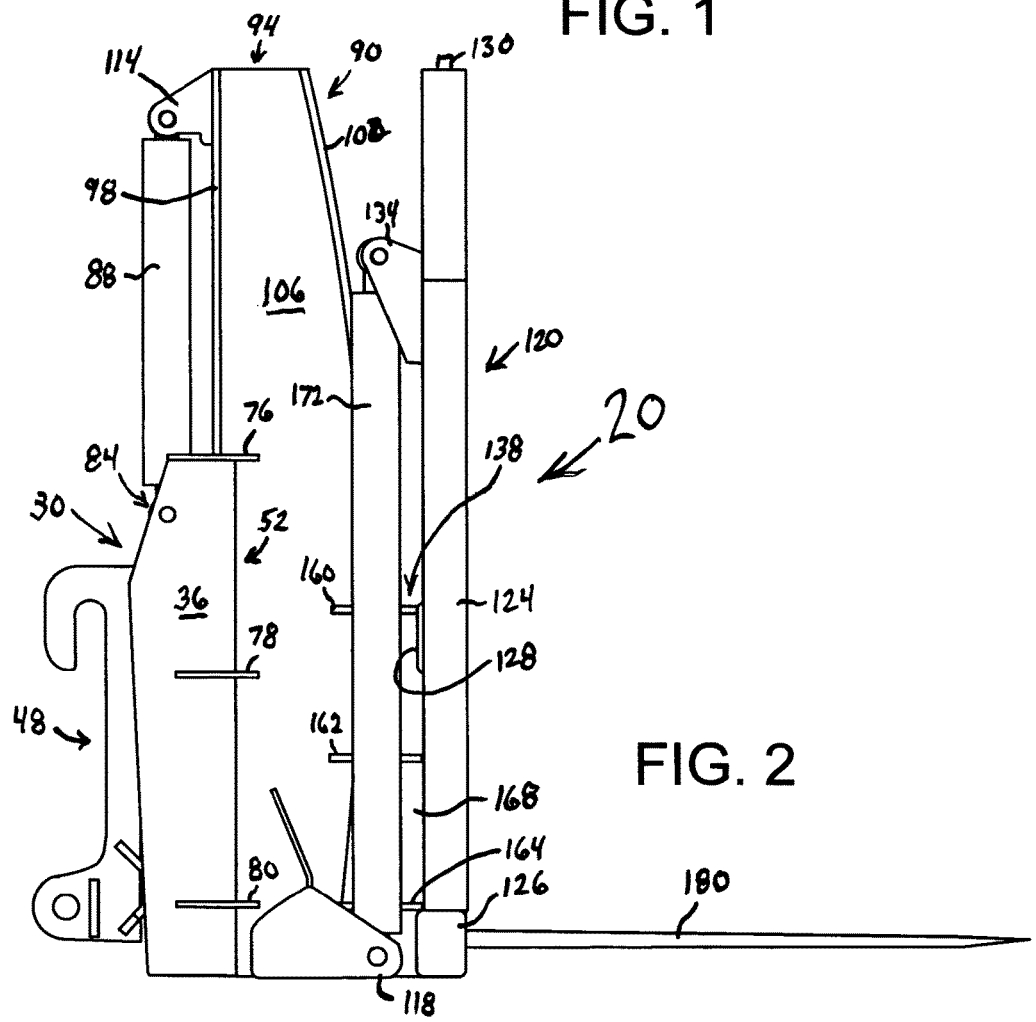
FIG. 2 is a side view of a high reach lifting big bale fork attachment 20 in a retracted down position.
Figure 23:
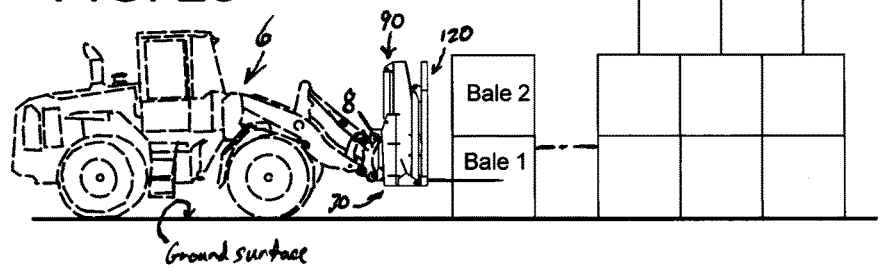
FIG. 23 is a side view of a high reach lifting big bale fork attachment 20 with a plurality of bale spears 180 partially inserted into a Bale 1.
Figure 24:
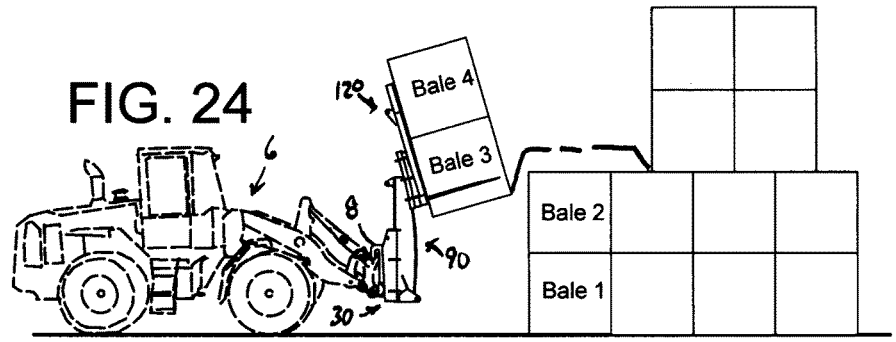
FIG. 24 is a side view of a high reach lifting big bale fork attachment 20 with a plurality of bale spears 180 fully inserted into a Bale 3 and showing two bales lifted by the bale fork attachment and showing the bale rack assembly 120 fully extended upward along the sliding mast assembly 90 (reference line shows the ability of the loader and bale fork attachment system to accomplish placement of the two bales offset to the right over the second bale layer of the stack at the right of the figure)
Figure 25:
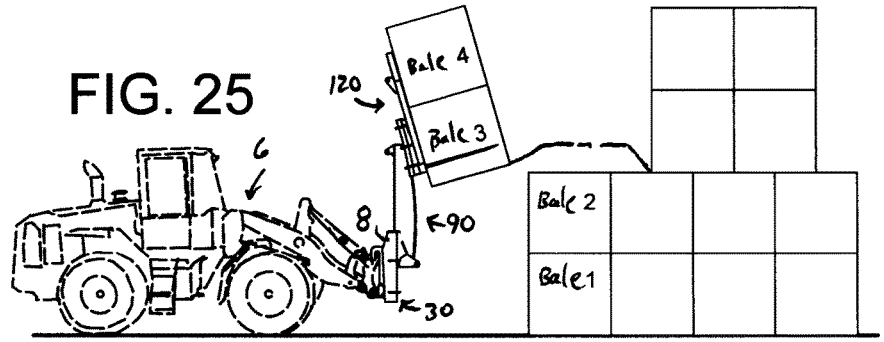
FIG. 25 is a side view of a high reach lifting big bale fork attachment 20 with a plurality of bale spears 180 fully inserted into a Bale 3 and showing two bales lifted by the wheel loader 6 and showing the bale fork attachment fully extended upward along the sliding mast assembly 90 (reference line shows the ability of the loader and bale fork attachment system to accomplish placement of the two bales offset to the right over the second bale layer of the stack at the right of the figure)
Figure 26:
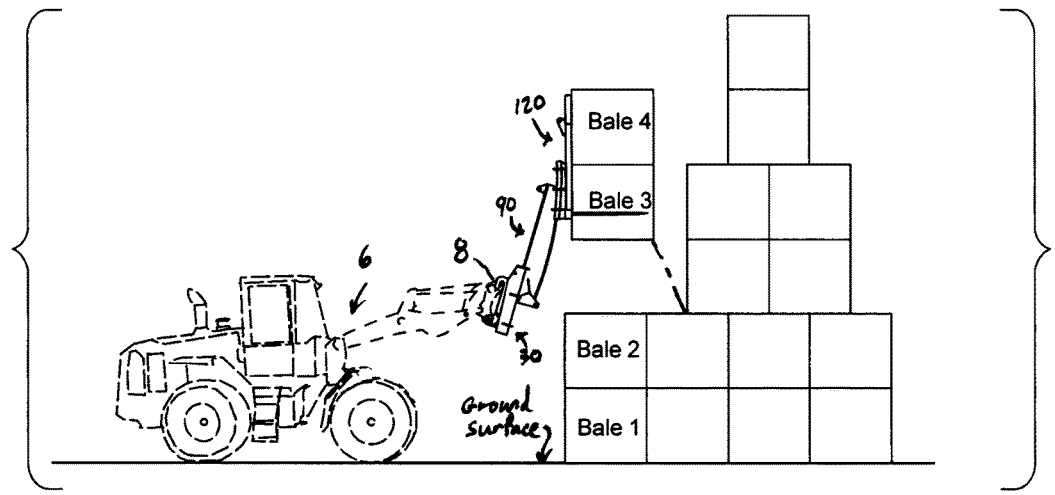
FIG. 26 is a side view of a high reach lifting big bale fork attachment 20 with a plurality of bale spears 180 fully inserted into a Bale 3 and showing two bales lifted by the wheel loader 6 and showing the bale fork attachment fully extended upward along the sliding mast assembly 90 (reference line shows the ability of the loader and bale fork attachment system to accomplish placement of the two bales offset to the right over the second bale layer of the stack at the right of the figure)
Figure 27:
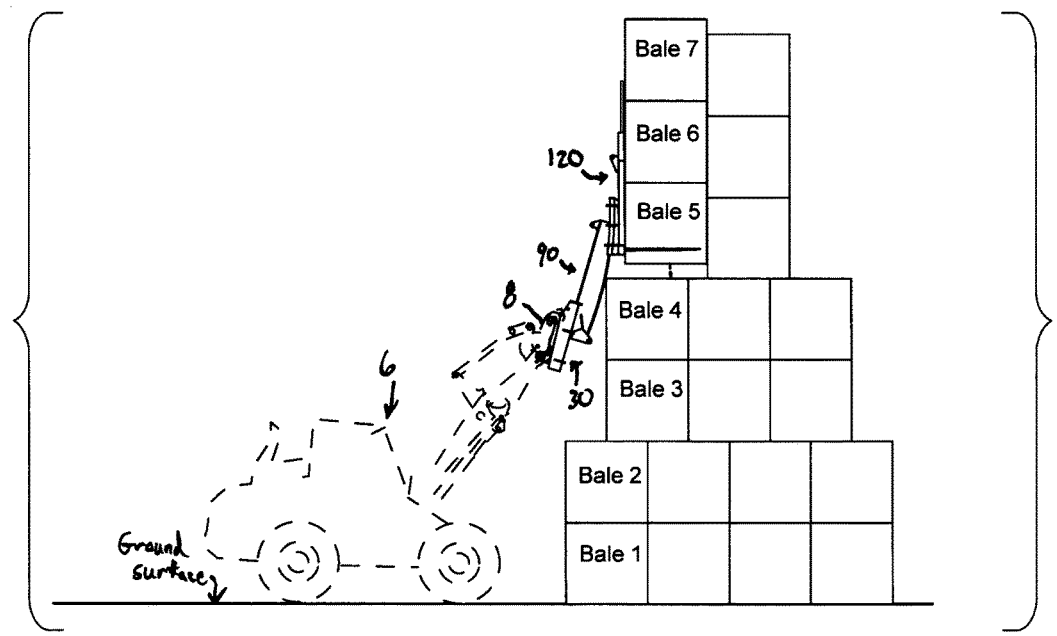
FIG. 27 is a side view of a high reach lifting big bale fork attachment 20 with a plurality of bale spears 180 fully inserted into a Bale 5 and partially offsetting bales 5 and 6 laterally beyond bale 4 over the fourth bale layer of the stack at the right of the figure.

Referring to FIGS. 1 to 27, the present invention is a novel high reach lifting big bale fork attachment 20 for a bale manipulator 8 such as a Volvo wheel loader or other suitable bale handling equipment. A method of using the high reach lifting big bale fork attachment 20 provides for lifting, selectively tilting, and depositing or retrieving a stack of one or more bales from one location to another location. The high reach lifting big bale fork attachment 20 can advantageously replace a non-extendable bale fork attachment.

The elements of the invention, a high reach lifting big bale fork attachment 20 to be attached to a wheel loader 6 or other bale handling equipment by means of an attachment coupler 8 comprise:

A. a rear coupler slide assembly 30 comprising:
  a generally horizontal upper bridging member 38 having two ends attached at said ends between and to
  two spaced planar frame end plates 34, 36, said end plates attached to a
  a horizontal lower bridging member 40 spaced below said upper bridging member, a plurality of loader attachment adapter mounting brackets 42, 42', 42", 44, 44', 44", each said mounting bracket having
  a plurality of mounting apertures 46, and said brackets spaced, distributed and attached to selected rear portions of said upper bridging member and said lower bridging member, and said brackets sized to cooperate and removably attach to a plurality of selected loader attachment adapters 48, 48' said adapters configured to interface and connect to said loader and adjustably and removably attached to said adapter mounting brackets preferably by nuts and bolts through
  a plurality of corresponding and cooperating apertures in said brackets and said adapters;
  two spaced straight rear mast coupler assemblies 50, 52 attached to and across two spaced front end portions of said upper bridging member and two spaced front end portions of said lower bridging member and sized to slidingly receive and cooperate with two spaced straight rear rails 96, 98 of two spaced mast I-beams 92, 94;
  each said straight rear mast coupler assembly comprising:
  a rear straight C-channel 54, 56 preferably open-ended having
  a planar rectangular rear main wall 58 having two longitudinal side edges 60, two spaced planar side walls 62 attached and depending forward from said side edges,
  two spaced coplanar front bracketing walls 64, 66 attached to and depending inward from said side walls, spaced from said rear main wall, and sized to define and form
  a front straight receiving gap 68 between said bracketing walls sized to slidingly receive and retain
  a portion of one of said rear rails and a portion of an I-web bridging member 104, 106 of said mast I-beams, and preferably
  a plurality of ultrahigh molecular weight (UHMW) plastic interfacing sheets 70 sized to fit and attached to the interior wall surfaces of each said wall of each said straight C-channel and said sheets preferably anchored to said walls by a plurality of respective countersunk bolts from the interior of said straight C-channels through said sheets and said C-channel walls and retained by
a plurality of nuts 74 to provide
a plurality of low friction sliding surfaces for said rear rails;
a plurality of rear mast coupler support flanges 76, 78, 80 attached between each said rear straight C-channel and the rest of said rear coupler slide assembly, and two pairs of spaced lower mast lifting actuator connecting ears 82, 84, each said pair attached to a respective selected upper portion of said slide assembly proximate said respective rear mast coupler assembly;
two spaced lifting mast actuators 86, 88 operatively connected to respective said pairs of lower mast lifting actuator connecting ears;
B. a sliding mast assembly 90 slidingly received and retained in said rear coupler slide assembly, said sliding mast assembly comprising:
two spaced mast I-beams 92, 94 each said I-beam having
one said respective straight rear rail 96, 98 and
a respective convex arced front rail 100, 102 respective said rear rails and said front rails preferably joined along their respective longitudinal midlines by
a respective I-web bridging member 104, 106, said mast I-beams spaced and attached one to the other by
a lower mast cross member 108 and preferably by
an upper mast cross member 110 spaced from said lower mast cross member, two pairs of spaced upper mast lifting actuator connecting ears 112, 114 attached to
selected outer rear upper surface of each respective said straight rear rail and operatively connected to respective said lifting mast actuators,
two pairs of spaced lower bale rack assembly actuator connecting ears 116, 118 attached to opposite outer ends of said lower mast cross member; and
C. a front bale rack assembly 120 slidingly receiving and retaining said front rails, said front bale rack assembly comprising:
two spaced frame side rails 122, 124 joined one to the other by
a lower horizontal frame cross rail 126 and also preferably by
an upper frame cross rail 128 spaced from said lower horizontal frame cross rail; preferably each said side rail has a selectively extendable vertical rear side of bale support member 130;
two pairs of spaced upper bale rack assembly lifting actuator connecting ears 132, 134 attached to selected respective outer rear upper surfaces of each said frame side rail;
two spaced concave arced front mast coupler assemblies 136, 138 each said front mast coupler assembly sized and attached to, across, and in back of said frame cross rails to slidingly receive and cooperate with respective said convex arced front rails of said sliding mast assembly;
each said front mast coupler assembly comprising:
a front concave arced C-channel 140, 142 preferably open-ended having
an arced front main wall 144 having
a longitudinal concave inside surface 146 and having
two spaced longitudinal side edges 148,
two spaced flat side walls 150 having
two spaced arced side edges 152 attached to respective said longitudinal side edges and depending forward from said concave inside surface;
two spaced rear bracketing walls 154, 155 attached and depending inward from said side walls, spaced from said front main wall, and sized to define and form
a rear concave receiving gap 156 between said coplanar rear bracketing walls sized to slidingly receive and retain
a portion of one of said front rails and
a portion of an I-web bridging member 104, 106 of said mast I-beams, and
a plurality of ultrahigh molecular weight (UHMW) plastic interfacing sheets 158 sized to fit and attached to the interior wall surfaces of each said wall of each said concave C-channel and said sheets preferably anchored to said walls by
a plurality of respective countersunk bolts from the interior of said C-channels through said sheets and said C-channel walls and retained by
a plurality of nuts 74' to provide
a plurality of low friction sliding surfaces for said front rails;
a plurality of front mast coupler support flanges 160, 162, 164 attached between each said front concave C-channel and the rest of said front bale rack assembly, and
a plurality of mast coupler assembly connecting gussets 166, 168 attached between selected portions of said front bale rack assembly;
two spaced lifting bale rack actuators 170, 172 operatively connected to and between respective said pairs of lower bale rack assembly actuator connecting ears and said pairs of upper bale rack assembly actuator connecting ears; and
a plurality of spaced bale spears 180 attached and depending forward from said lower horizontal frame cross rail and generally perpendicularly to the general front plane of said bale rack assembly.

Preferably, the four actuators of the invention are powered and controlled by a single preexisting remote hydraulic circuit of the wheel loader. Generally, the hydraulic lines are not shown in the figures to allow a clearer viewing of the structural elements of the invention. In the basic embodiment, the four actuators are each single stage actuators and are connected to the same hydraulic circuit of the wheel loader and the bale fork attachment extends or retracts by manipulation of said hydraulic circuit by the operator of the wheel loader. Preferably, the bale rack actuators have greater bore diameters than the mast actuators to allow the front bale rack assembly to ascend before the sliding mast assembly ascends. In an alternative embodiment, the lifting mast actuators could be two stage actuators with a greater range of extension than depicted in the figures and in such an alternative embodiment alternative taller straight rear mast coupler assemblies could be used to achieve a greater range of elevation by the alternative fork attachment.

A majority of the structural components of the invention are preferably made from sheet steel stock, round or square steel tubing stock, or suitable materials used in making the preexisting receiving table. Means of joining of elements of the invention one to another preferably may include welding. The UHMW plastic sheeting disclosed above is a high strength, durable yet somewhat pliable plastic material that provides a slippery interfacing surfaces for the plurality of rails of the invention and is used in the best embodiment of the invention. A less desirable alternative embodiment of the invention would not use the UHMW plastic sheets.

In another alternative embodiment of the invention, a plurality of rolling traveler mast coupler assemblies using wheels or rollers could be used in place of the C-channels of the best embodiment in the mast coupler assemblies.

In another alternative embodiment of the invention, instead of having a plurality of spaced bale spears 180 attached and depending forward from said lower horizontal frame cross rail and generally perpendicularly to the general front plane of said bale rack assembly, a plurality of spaced lifting members are attached and depending forward from said lower horizontal frame cross rail and generally perpendicularly to the general front plane of said bale rack assembly.

The preceding description and exposition of a preferred embodiment of the invention is presented for purposes of illustration and enabling disclosure. It is neither intended to be exhaustive nor to limit the invention to the precise form disclosed. Modifications or variations in the invention in light of the above teachings that are obvious to one of ordinary skill in the art are considered within the scope of the invention as determined by the appended claims when interpreted to the breath to which they are fairly, legitimately and equitably entitled.

I claim:

1. A high reach lifting big bale fork attachment for a wheel loader or other bale handling equipment comprising: a rear coupler and slide assembly, slidably attached to a sliding mast assembly, said mast assembly slidably attached to a front bale rack assembly; a plurality of actuators operatively connected to and between said slide assembly and said mast assembly, a plurality of actuators operatively connected to and between said mast assembly and said front bale rack assembly, and a loader attachment adapter attached to said rear coupler and slide assembly wherein said rear coupler and slide assembly further comprising a straight C-channel; said sliding mast assembly further comprising a mast I-beam having a straight rear rail and a convex arced front rail, said rear rail and said front rail joined together by an I-web bridging member; said front bale rack assembly further comprising a front concave arced C-channel; and said straight C-channel slidingly receives and retains said straight rear rail, and said front concave arced C-channel slidingly receives and retains said arced front rail.

2. A high reach lifting big bale fork attachment in accordance with claim 1 wherein said front bale rack assembly further comprising: two spaced frame side rails joined one to the other by a lower horizontal frame cross rail and by an upper frame cross rail spaced from said lower horizontal frame cross rail;
a plurality of lifting members attached and depending forward from said lower horizontal frame cross rail and generally perpendicularly to the general front plane of said bale rack assembly.

3. A high reach lifting big bale fork attachment in accordance with claim 2 wherein said lifting members are bale spears.

4. A high reach lifting big bale fork attachment in accordance with claim 2 wherein each said side rail has a selectively extendable vertical rear side of bale support member.

5. A high reach lifting big bale fork attachment in accordance with claim 1 wherein said rear coupler and slide assembly further comprising a plurality of ultrahigh molecular weight (UHMW) plastic interfacing sheets sized to fit and attached to the interior wall surfaces of each said wall of said straight C-channel and said sheets anchored to said walls.

6. A high reach lifting big bale fork attachment in accordance with claim 1 wherein said front bale rack assembly further comprising a plurality of ultrahigh molecular weight (UHMW) plastic interfacing sheets sized to fit and attached to the interior wall surfaces of each said wall of said concave C-channel and said sheets anchored to said walls to provide a plurality of low friction sliding surfaces for said front rails.

7. A high reach lifting big bale fork attachment to be attached to a wheel loader or other bale handling equipment by means of an attachment adapter comprising:
A. a rear coupler slide assembly comprising:
a generally horizontal upper bridging member having two ends attached at said ends between and to two spaced planar frame end plates, said end plates attached to a horizontal lower bridging member spaced below said upper bridging member,
a plurality of loader attachment adapter mounting brackets, each said mounting bracket having a plurality of mounting apertures, and said brackets spaced, distributed and attached to selected rear portions of said upper bridging member and said lower bridging member, and said brackets sized to cooperate and removably attach to a plurality of selected loader attachment adapters, said adapters configured to interface and connect to said loader and said adapters adjustably and removably attached to said adapter mounting brackets;
two spaced straight rear mast coupler assemblies attached to and across two spaced front end portions of said upper bridging member and two spaced front end portions of said lower bridging member and sized to slidingly receive and cooperate with two spaced straight rear rails of two spaced mast I-beams;
each said straight rear mast coupler assembly comprising:
an open-ended rear straight C-channel having a planar rectangular rear main wall having two longitudinal side edges, two spaced planar side walls attached and depending forward from said side edges, two spaced coplanar front bracketing walls attached to and depending inward from said side walls, spaced from said rear main wall, and sized to define and form a front straight receiving gap between said bracketing walls sized to slidingly receive and retain a portion of one of said rear rails and a portion of an I-web bridging member of said mast I-beams, a plurality of rear mast coupler support flanges attached between each said rear straight C-channel and the rest of said rear coupler slide assembly, and two pairs of spaced lower mast lifting actuator connecting ears, each said pair attached to a respective selected upper portion of said slide assembly proximate said respective rear mast coupler assembly; two spaced lifting mast actuators operatively connected to respective said pairs of lower mast lifting actuator connecting ears;
B. a sliding mast assembly slidingly received and retained in said rear coupler slide assembly, said sliding mast assembly comprising:
two spaced mast I-beams, each said I-beam having one said respective straight rear rail and a respective convex arced front rail, respective said rear rails and said front rails joined along their respective longitudinal midlines by a respective I-web bridging member, said mast I-beams spaced and attached one to the other by a lower mast cross member and by an upper mast cross member spaced from said lower mast cross member, two pairs of spaced upper mast lifting actuator connecting ears attached to a selected outer rear upper surface of each respective said straight rear rail and operatively connected to respective said lifting mast actuators, two pairs of spaced lower bale rack assembly actuator connecting ears attached to opposite outer ends of said lower mast cross member; and C. a front bale rack assembly slidingly receiving and retaining said front rails, said front bale rack assembly comprising:

two spaced frame side rails joined one to the other by a lower horizontal frame cross rail and by an upper frame cross rail spaced from said lower horizontal frame cross rail; two pairs of spaced upper bale rack assembly lifting actuator connecting ears attached to selected respective outer rear upper surfaces of each said frame side rail; two spaced concave arced front mast coupler assemblies each said front mast coupler assembly sized and attached to, across, and in back of said frame cross rails to slidingly receive and cooperate with respective said convex arced front rails of said sliding mast assembly;

each said front mast coupler assembly comprising:

an open-ended front concave arced C-channel having an arced front main wall having a longitudinal concave inside surface and having two spaced longitudinal side edges, two spaced flat side walls having two spaced arced side edges attached to respective said longitudinal side edges and depending forward from said concave inside surface, two spaced rear bracketing walls attached and depending inward from said side walls, spaced from said front main wall, and sized to define and form a rear concave receiving gap between said coplanar rear bracketing walls sized to slidingly receive and retain a portion of one of said front rails and a portion of an I-web bridging member of said mast I-beams, and a plurality of front mast coupler support flanges attached between each said front concave C-channel and the rest of said front bale rack assembly, and a plurality of mast coupler assembly connecting gussets attached between selected portions of said front bale rack assembly;

two spaced lifting bale rack actuators operatively connected to and between respective said pairs of lower bale rack assembly actuator connecting ears and said pairs of upper bale rack assembly actuator connecting ears; and a plurality of spaced lifting members attached and depending forward from said lower horizontal frame cross rail and generally perpendicularly to the general front plane of said bale rack assembly.

8. A high reach lifting big bale fork attachment in accordance with claim 7 wherein said lifting members are bale spears.

9. A high reach lifting big bale fork attachment in accordance with claim 7 wherein each said straight rear mast coupler assembly further comprising a plurality of ultrahigh molecular weight (UHMW) plastic interfacing sheets sized to fit and attached to the interior wall surfaces of each said wall of each said straight C-channel and said sheets anchored to said walls.

10. A high reach lifting big bale fork attachment in accordance with claim 7 wherein each said front mast coupler assembly further comprising a plurality of ultrahigh molecular weight (UHMW) plastic interfacing sheets sized to fit and attached to the interior wall surfaces of each said wall of each said concave C-channel and said sheets anchored to said walls to provide a plurality of low friction sliding surfaces for said front rails.

11. A high reach lifting big bale fork attachment in accordance with claim 7 wherein each said side rail has a selectively extendable vertical rear side of bale support member.

* * * * *